United States Patent Office 3,289,462
Patented Dec. 6, 1966

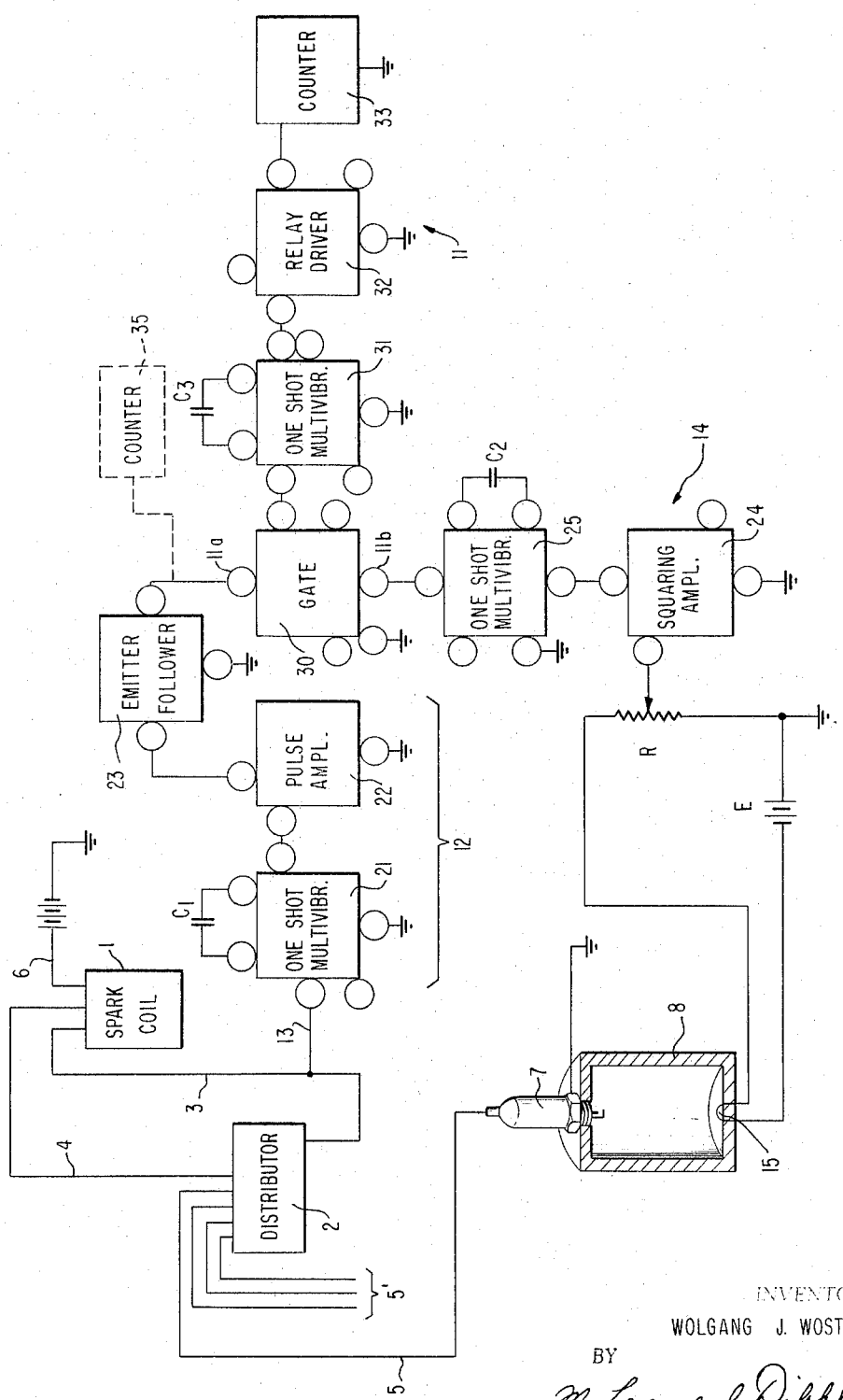

3,289,462
METHOD AND APPARATUS FOR ANALYZING OPERATION OF SPARK IGNITION ENGINE
Wolfgang J. Wostl, South Holland, Ill., assignor to Sinclair Research, Inc., New York, N.Y., a corporation of Delaware
Filed Apr. 24, 1964, Ser. No. 362,428
15 Claims. (Cl. 73—35)

The present invention relates to a method and apparatus for analyzing the operational characteristics of a spark discharge means. More particularly, the invention relates to a method and apparatus adapted for analyzing such characteristics in a spark-ignition internal combustion engine through an electrical comparison of the number of firing opportunities for one or more engine cylinders with the number of effective spark discharge incidents during any given period of operation. Specifically, the invention relates to a spark plug misfire counter and its method of employment and operation.

In spark-ignition, internal combustion engines, it is important to be able to determine the operating characteristics of the ignition system, and particularly the functioning characteristics of the spark-discharge means employed. Further, it is desirable to have a method and means for determining the effects of various fuel and lubricant compositions on the firing characteristics of the spark-discharge ignition means. By the means and method according to the present invention, it has been found possible to analyze and determine the operating characteristics of a spark-ignition internal combustion engine.

It is therefore an object of the present invention to provide a method and means for analyzing the function and character of spark-discharge in an internal combustion engine. It is also an object of the invention to provide a method and means for accurately determining the number of misfire incidents for engine spark plugs under various operating conditions. The invention and its objects may be more fully understood from the following description when it is read in conjunction with the accompanying drawing which is a diagrammatic showing of the apparatus according to the invention, including the relationship thereof to the conventional ignition circuit of a spark-ignition internal combustion engine and a block diagram of the electrical and electronic components of the apparatus, including representative indication of the functions performed by each of these components.

An embodiment of the apparatus of the present invention detects and records the number of times the primary of the ignition coil in a single cylinder research engine is energized and also the number of times ignition or detonation of the fuel is accomplished in the combustion chamber of such engine. In the embodiment as shown in the drawing, the pulse fed to the primary of the ignition circuit is used to signal a misfire counting system that combustion should occur within a given time interval. An ionization gap located in the combustion chamber at a position opposite to the spark plug detects the presence of a flame that results by proper firing of the spark plug. Fouling of the plug will be sensed by the misfire counting system due to the absence of a flame at the ionization gap although a pulse has been fed to the primary of the ignition coil.

In the diagrammatic showing of the apparatus provided by the drawing, the numeral 1 designates the ignition or spark coil of an internal combustion engine which is conventionally connected to a distributor 2 for such engine by primary and secondary leads 3 and 4, respectively. Conductor 5 is provided for the individual connection of the illustrated spark plug 7 with the spark coil 1. If a single spark plug is to be used, the distributor 2 may be omitted; however, as shown, leads 5' are provided for the spark plugs of additional engines or for the additional spark plugs of a multi-cylinder engine. Spark plug 7 is arranged in combustion chamber 8 which is supplied fuel, e.g., gasoline, by conventional means (not shown). The numeral 6 designates the connection of the ignition to the battery. In use, discharge of spark coil 1 creates a pulse in the primary lead 3 which is passed to the spark plug 7 which sparks and normally causes burning of the fuel in the combustion chamber 8.

The block diagram of the drawing is also representative of the circuitry and components of the misfire counting system which is connected to the ignition coil primary lead 3 of the engine ignition circuit by means of lead 13. This system includes, in addition to an actual counting circuit 11, two principal circuits generally designated by numerals 12 and 14 connected, respectively, to terminal 11A and 11B of gating means 30. Circuits 12 and 14 may be designated, respectively, as the "sparking transmission circuit" and "reading transmission circuit" for the purpose of distinction. Fouling of the plug 7 will be sensed by the misfiring counting system due to the absence of combustion in chamber 8, although a pulse, i.e., a sparking current for plug 7, has been fed to the primary lead 3 of the ignition coil, through a correlation of the pulses in the sparking circuit 12 and the reading circuit 14 as more fully described hereinafter.

In the system illustrated, each ignition pulse in primary lead 3 activates the one-shot multivibrator 21 which produces an ignition signal corresponding to the ignition pulse. This ignition signal is then amplified in pulse amplifier 22. The multivibrator 21 and pulse amplifier 22 in the sparking circuit 12 are also designed to delay the ignition signal. The one-shot multivibrator 21 is triggered by the positive rise of its input coming from the discharge of the spark coil 1. The multivibrator 21 will stay in its "on" position for time $\Delta t$ determined by condenser $C_1$. When the output of multivibrator 21 returns to its normal position, pulse amplifier 22 will be triggered by the positive rise of the $\Delta t$ pulse. Once triggered, pulse amplifier 22 will send out a pulse and return to its normal position. The delay time has a duration that is essentially equal to at least the time required for the flame produced by the spark at plug 7 to cross the combustion chamber 8 from the spark plug 7 to the ionization gap 15. This time delay should not, however, exceed the time between the pulses in primary lead 3. Emitter follower 23 matches the impedance of the ignition signal from the pulse amplifier 22 to the gate input for gate 30.

Gate 30 is in effect an electronic interrupter switch, or circuit breaker means, which is arranged, for example, in a preferred embodiment to cut off the ignition signal under certain circumstances to be explained later, but in the absence of such circumstances, the ignition signal activates one-shot multivibrator 31 to produce a pulse which passes through relay driver 32 wherein a signal suitable to actuate counter 33 is produced. Without such cut-off action by gate 30, each pulse in primary lead 3 is passed through the sparking circuit 12, including gate 30, to actuate counter 33. Accordingly, in the absence of such cut-off action the counter 33 will register each pulse and thereby each spark plug firing opportunity afforded by operation of spark coil 1 or distributor 2. In one arrangement, a counter 35 may be connected in the sparking circuit 12 ahead of gate 30 in order to provide a means for counting firing opportunities continuously and without regard for the cut-off action of the gate 30.

Returning now to the reading circuit 14 and, assuming the spark plug 7 has fired and produced a flame in combustion chamber 8, the flame will, a few milliseconds after firing, arrive at the ionization gap 15 which is arranged in the cylinder combustion area. Ionization gap 15 functions similarly to a switch and is closed by the flame to actuate the reading circuit 14 which contains a battery E and resistor R. Preferably, the ionization gap 15 is arranged opposite to the spark plug 7. The ionization gap may, if desired, be replaced by other means in the cylinder 8 for detecting combustion therein such as a pressure pick-up spark plug which is especially desirable in multi-cylinder engines not having a second cylinder hole. Pressure pick-up spark plugs have a piezoelectric pressure transducer which, for example, give a signal upon the increase in pressure in the cylinder experienced when combustion occurs. This signal would be fed to a voltage level detector, voltage comparator, which compares the signal to a reference voltage and gives out a pulse when the signal is greater than the reference voltage.

Closing of ionization gap 15 in reading circuit 14 results in a voltage drop developed across resistor R which in turn feeds a pulse to the squaring amplifier 24 which amplifies and shapes the pulse to deliver a reading signal to the one-shot vibrator 25 where the duration of the signal is determined by condenser $C_2$ in a manner similar to multivibrator 21 discussed above. The output of vibrator 25 controls the cut-off action of gate 30. Vibrator 25 holds the gate open for a period of time determined by $C_2$ to ensure no counting. This time is long enough to block the pulse sent to the gate from the pulse amplifier 22. In the preferred embodiment of the invention where a signal is present at the output of the multivibrator 25 (when a flame is present at the ionization gap 15), the gate 30 will be closed to open the connection between the sparking circuit 12 and the counting unit 11 so that no signal will be fed to the counter unit 11. If, however, no flame arrives at the ionization gap 15, the gate 30 will remain open and the connection between circuit 12 and circuit 14 closed so that reading circuit 14 is not energized. Accordingly, in the preferred embodiment, the ignition signal produced by the pulse in primary lead 3 of the ignition coil 1 will, after having been delayed by the time delay of sparking circuit 12, pass through gate 30 to activate one-shot multivibrator 31, as described above, and register one count on the counter 33. Counter 33 will, therefore, register and add the number of firing opportunities the spark plug 7 had and no flame subsequently arrived at the ionization gap 15 which is in effect the number of spark plug misfires. The one-shot multivibrator 31 determines the duration of the pulse emerging from the gate 30 through condenser $C_3$ so that every pulse passing through the gate 30 will register a count on the counter 33. Alternately, in a modification of the present system the gate may be designed to normally remain closed to prevent passage therethrough of the ignition signal and to open when a signal is present at the output of the multivibrator 25 (when a flame is present at the ionization gap 15) so that the number of times the spark plug is fired is counted. This would be the opposite of counting spark plug misfires although the number of times the spark plug failed can be easily derived by subtracting the number of fires from the total number of ignition signals sent to the spark plug which is counted by counter 35.

Although the invention has been described in terms of a preferred embodiment, changes and modifications of the present invention obvious to one skilled in the art are deemed to be within the scope and contemplation of the invention in its broadest aspect.

It is claimed:

1. In combination with a combustion chamber adapted to receive a fuel and ignition means for igniting said fuel including spark discharge means arranged to discharge within said chamber and pulse delivery means adapted to deliver a voltage pulse to said spark discharge means whereby said spark discharge means sparks and ignites said fuel, an apparatus for analyzing the operational characteristics of said spark discharge means which comprises a first pulse transmission circuit having an input coupled with said ignition means whereby to impress on said first circuit an initial voltage signal for each voltage pulse to said spark discharge means, first component means in said first transmission circuit adapted to delay transmission of said initial signal for a period of time less than the time between each voltage pulse, a second transmission circuit including means arranged in said chamber to sense the existence therein of ignition of said fuel, and means for developing a characteristic electrical pulse when said desired characteristic is present in said chamber, second component means in said second transmission circuit adapted to produce an output signal corresponding to said electrical pulse, a counting circuit including means for counting individual current pulses adapted for activation by said initial signal, circuit breaker means between said first transmission circuit and said pulse counting means adapted to electrically connect said first transmission circuit and said pulse counting means, and means including said second transmission circuit for operating said circuit breaker means by impressing said output signal of said second transmission circuit upon said circuit breaker means to control operation thereof.

2. Apparatus as defined in claim 1 wherein said circuit breaker means is biased to normally maintain an electrical connection between said first transmission circuit and said pulse counting means and the last-mentioned means impresses said output signal upon said circuit breaker means to overcome the bias thereof whereby to break said connection between said first transmission circuit and said pulse counting means upon the presence of said characteristic in said chamber.

3. Apparatus as defined in claim 1 wherein said circuit breaker means is biased to normally break the electrical connection between said first transmission circuit and said pulse counting means, and the last-mentioned means impresses said output signal upon said circuit breaker means to overcome the bias thereof whereby to close said connection between said first transmission circuit and said pulse counting means upon the presence of said characteristic in said chamber.

4. In combination with a combustion chamber adapted to receive a fuel and ignition means for igniting said fuel including spark discharge means arranged to discharge within said chamber and pulse delivery means adapted to deliver a voltage pulse to said spark discharge means whereby said spark discharge means sparks and ignites said fuel, an apparatus for analyzing the operational characteristics of said spark discharge means which comprises a first pulse transmission circuit having an input coupled with said ignition means whereby to impress on said first circuit an initial voltage signal for each voltage pulse to said spark discharge means, first component means in said first transmission circuit adapted to delay transmission of said initial signal for a period of time less than the time between each voltage pulse, a second transmission circuit including means arranged in said chamber to sense the presence of combustion therein, and means for developing a characteristic electrical pulse when said combustion is present in said chamber comprising an ionization gap means, said first component means delaying transmission of said initial signal at least as long as it takes for the flame produced by said discharge means to travel from said spark discharge means to said ionization gap means, second component means in said second transmission circuit adapted to produce an output signal corresponding to said electrical pulse, a counting circuit including means for counting individual current pulses adapted for activation by said initial signal, circuit breaker means between said first transmission circuit and said pulse counting means adapted to electrically connect said first transmission circuit and said pulse counting means, and means including said second transmission circuit for operating said circuit breaker means by impressing said output signal for said second transmission circuit upon said circuit breaker means to control operation thereof.

5. In combination with a combustion chamber adapted to receive a fuel and ignition means for igniting said fuel including spark discharge means arranged to discharge within said chamber and pulse delivery means adapted to deliver a voltage pulse to said spark discharge means whereby said spark discharge means sparks and ignites said fuel, an apparatus for analyzing the operational characteristics of said spark discharge means which comprises a first pulse transmission circuit having an input coupled with said ignition means whereby to impress on said first circuit an initial voltage signal for each voltage pulse to said spark discharge means, first component means in said first transmission circuit adapted to delay transmission of said initial signal for a period of time less than the time between each voltage pulse, a second transmission circuit including means arranged in said chamber to sense the presence of combustion therein, and means for developing a characteristic electrical pulse when said combustion is present in said chamber comprising a pressure pick-up spark plug, said pressure pick-up spark plug also constituting said spark discharge means, second component means in said second transmission circuit adapted to produce an output signal corresponding to said electrical pulse, a counting circuit inlcuding means for counting individual current pulses adapted for activation by said initial signal, circuit breaker means between said first transmission circuit and said pulse counting means adapted to electrically connect said first transmission circuit and said pulse counting means, and means including said second transmission circuit for operating said circuit breaker means by impressing said output signal of said second transmission circuit upon said circuit breaker means to control operation thereof.

6. Apparatus as defined in claim 1 wherein said first component means include a one-shot multivibrator and a pulse amplifier.

7. Apparatus as defined in claim 1 wherein said means arranged in said chamber is an ionization gap means and said second transmission circuit includes an electrical circuit including said ionization gap means, battery means and a resistor, said ionization gap closing upon the presence of combustion in said chamber to develop a voltage drop across said resistor which feeds a pulse corresponding to said characteristic electrical pulse to said second component means.

8. Apparatus as defined in claim 7 wherein said second component means include a squaring amplifier and a one-shot multivibrator.

9. Apparatus for measuring detonation in internal combustion engines having a combustion chamber adapted to contain a fuel, at least one spark discharge means arranged in said chamber, and means for supplying electrical pulses to said spark discharge means to create spark discharges in said chamber and ignite said fuel, comprising a counting circuit, a sparking transmission circuit, gating means adapted to electrically connect said counting circuit and said sparking transmission circuit, said sparking transmission circuit including first component means for transmitting a first signal representative of each said ignition pulse to said gating means, a reading transmission circuit including first means adapted to be arranged in said chamber for generating a reading signal upon the existence therein of a desired operational characteristic of said spark discharge means resulting from the igniting of said fuel and second component means for transmitting said reading signal to said gating means to control operation thereof, said sparking transmission circuit including delay means for delaying transmission of said first signal to said gating means until said gating means has determined the presence or absence of combustion in said chamber, said delay being for a period of time less than the time between each electrical pulse to said spark discharge means, said counting circuit including means for indicating the number of times said first signal passes through said gating means.

10. Apparatus for measuring detonation in internal combustion engines having a combustion chamber adapted to contain a fuel, at least one spark discharge means arranged in said chamber, and means for supplying electrical pulses to said spark discharge means to create spark discharges in said chamber and ignite said fuel, comprising a counting circuit, a sparking transmission circuit, gating means normally biased to connect said counting circuit and said sparking transmission circuit, said sparking transmission circuit including first component means for transmitting a first signal representative of each said ignition pulse to said gating means, a reading transmission circuit including first means for generating a reading signal upon the presence of combustion in said chamber resulting from the igniting of said fuel and second component means for transmitting said reading signal to said gating means to overcome the bias thereof, said sparking transmission circuit including delay means for delaying transmission of said first signal to said gating means until said gating means has determined the presence or absence of combustion in said chamber, said delay being for a period of time less than the time between each electrical pulse to said spark discharge means, said first signal passing through said gating means when said combustion is not present in said chamber and a reading signal is consequently not generated, and said counting circuit including means for indicating the number of times said first signal passes through said gating means.

11. Apparatus as defined in claim 10 wherein said first means of said reading transmission circuit comprises an electrical circuit having an ionization gap therein, said ionization gap being arranged in said combustion chamber substantially in the path of the flame produced upon ignition of the fuel, said flame closing said gap to generate said reading signal.

12. Apparatus as defined in claim 10 wherein said indicating means is a counter for registering said number of times said first signal passes through said gating means.

13. A method of analyzing the operational characteristics of a spark plug or fuel in an internal combustion engine having at least one spark plug arranged in a combustion chamber, fuel supply means for said chamber and discharge means for supplying a spark discharge pulse to said spark plug to ignite the fuel, comprising generating an ignition signal with each pulse delivered to the spark plug of said engine, transmitting said ignition signal to a gating device, generating a reading signal upon the presence of combustion in said chamber resulting from the firing of said spark plug, transmitting said reading signal to said gating device to prevent passage therethrough of said ignition signal, delaying passage of said ignition signal to said gating device until the device has determined the presence or absence of combustion in said chamber, said ignition signal passing through the gate when said combustion and consequently said reading signal are not generated, and indicating the number of times said first-mentioned signal passes through said gate.

14. A method of analyzing the operational characteristics of a spark plug or fuel in an internal combustion engine having at least one spark plug arranged in a combustion chamber, fuel supply means for said chamber and means for supplying a spark discharge pulse to said spark plug to ignite the fuel, comprising generating an ignition signal with each pulse delivered to the spark plug of said engine, transmitting said ignition signal to a gating device, generating a reading signal upon the presence of combustion in said chamber resulting from the firing of said spark plug, transmitting said reading signal to said gating device to allow passage therethrough of said ignition signal, delaying passage of said ignition signal to said gating device until the device has determined the presence or absence of combustion in said chamber, said ignition signal passing through the gate when said combustion and consequently said reading signal is generated, and indicating the number of times said first-mentioned signal passes through said gate.

15. A method of analyzing the operational characteristics of an internal combustion engine having at least one spark plug arranged in a combustion chamber, fuel supply means for said chamber and means for supplying a spark discharge pulse to said spark plug to ignite the fuel, comprising generating an ignition signal with each pulse delivered to the spark plug of said engine, transmitting said ignition signal to a gating device, generating a reading signal by the flame resulting from the firing of said spark plug in said chamber, transmitting said reading signal to said gating device to prevent passage therethrough of said ignition signal, delaying passage of said ignition signal to said gating device until the device has determined the presence or absence of a reading signal, said ignition signal passing through the gate when said reading signal is not generated, and determining electrically the number of times said first-mentioned signal passes through said gate.

References Cited by the Examiner
UNITED STATES PATENTS

| | | | |
|---|---|---|---|
| 2,962,654 | 11/1960 | Wilson | 73—35 X |
| 3,035,224 | 5/1962 | Whaley et al. | 73—35 |
| 3,126,733 | 3/1964 | Heigl et al. | 73—35 |

RICHARD C. QUEISSER, *Primary Examiner.*

J. J. GILL, *Assistant Examiner.*